Dec. 16, 1924.
L. A. MAPEL
LIQUID LEVEL INDICATOR
Filed Oct. 25, 1920
1,519,792
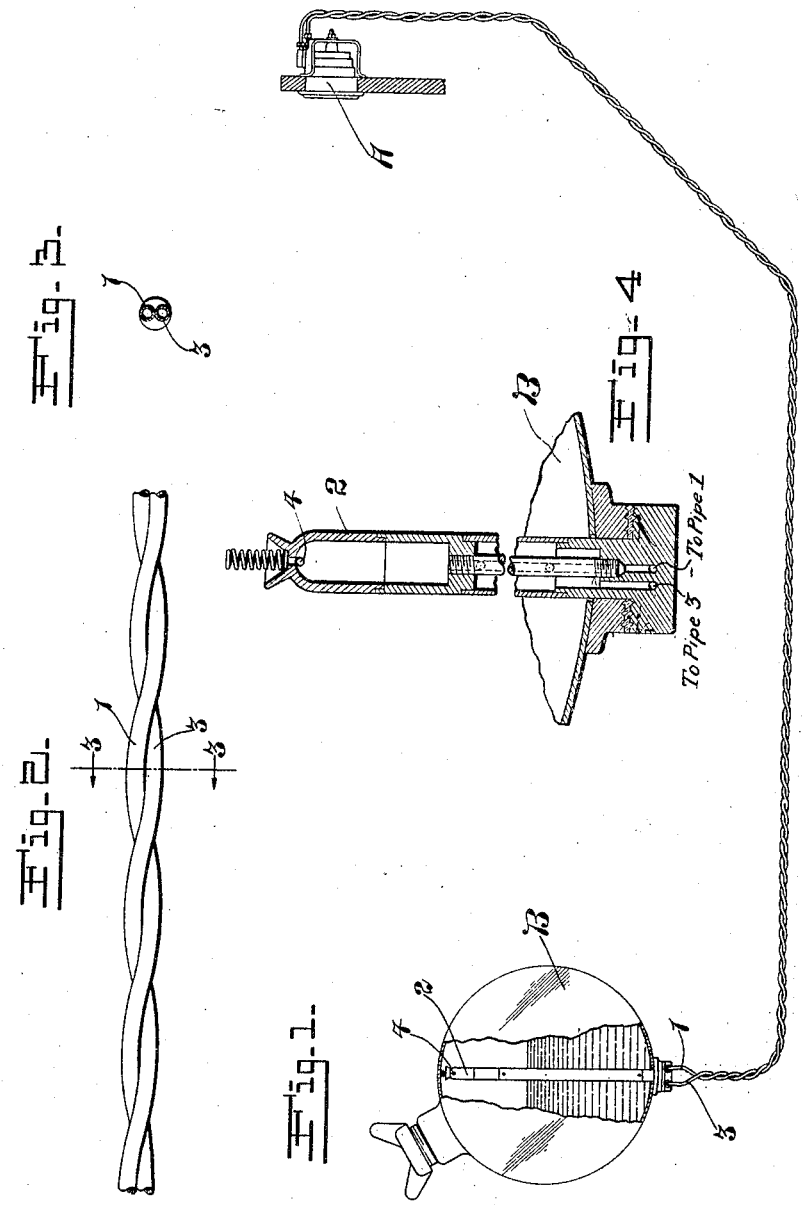

Patented Dec. 16, 1924.

1,519,792

UNITED STATES PATENT OFFICE.

LEWIS A. MAPEL, OF ST. LOUIS, MISSOURI, ASSIGNOR TO THE AUTOMATIC APPLIANCE COMPANY, OF ST. LOUIS, MISSOURI, A CORPORATION OF MISSOURI.

LIQUID-LEVEL INDICATOR.

Application filed October 25, 1920. Serial No. 419,553.

*To all whom it may concern:*

Be it known that I, LEWIS A. MAPEL, a citizen of the United States, residing at the city of St. Louis and State of Missouri, have invented new and useful Liquid-Level Indicators, of which the following is a specification.

This invention relates to liquid level indicators of the type which are used for giving indication of the height, depth or quantity of liquid, or the contents of liquid containers.

My present invention relates specially to the means for maintaining columns of liquid for communication between an indicating device and different bodies of liquid, and comprises a novel construction and arrangement for maintaining the columns of liquid in such relative positions that they will not be differently affected by changes, such as barometric changes, changes in temperature, acceleration, or other changes or conditions encountered or occurring in the use of the instruments of which the present invention constitutes a part.

I am aware that the results may be obtained by specifically different forms and construction, and I do not confine myself to the identical form and construction shown, except where such limitation is imposed by the scope and terms of the appended claims.

An object of the invention is to provide efficient means for maintaining the separate columns of liquid so that they will be affected alike under all changes that occur or are encountered in the use of the instrument embodying the invention. This constitutes a highly desirable result for, if the separate columns of liquid are permitted to be differently affected the desired precision of operation of the indicating device will not be maintained, and the accuracy of the information furnished by the indicating device constitutes one of the valuable features of the instrument. Therefore the advantage of accomplishing the intended objects of the present invention is apparent.

Indicating instruments of the type of which my present invention is intended to constitute a part have been satisfactorily used in connection with automobiles for indicating the approximately exact height, depth or quantity of liquid fuel in the supply tank. The indicating instruments have also been used for other purposes, but for purposes of convenience, I have chosen to illustrate the present invention embodied in an indicating instrument mounted in connection with an automobile for the purposes above stated.

Referring to the drawings in which the invention is shown—

Fig. 1 is a view illustrating the general arrangement of an indicating instrument applied to an automobile to indicate the approximately exact height, depth or quantity of liquid fuel in the supply tank, the indicating device being located on the instrument board and the present invention appearing as connections from the indicating device to the supply tank.

Fig. 2 is an enlarged view showing clearly a preferred arrangement of the pipes or tubes in which the columns of liquid above and hereinafter referred to are maintained.

Fig. 3 is a sectional view on the line 3—3 of Fig. 2 of the pipes or tubes.

Fig. 4 is a sectional view of the fitting having passages therethrough communicating with the liquid confining pipes.

As shown in Fig. 1, which is a diagrammatic view of the complete indicating instrument applied to an automobile, the indicating device A is supported in a position convenient for observation and, as shown, this may be on the instrument board of the automobile. In this use of an indicating instrument containing the present invention the instrument affords constant indication of the approximately exact height, depth or quantity of liquid contained in the fuel supply tank B. My invention is not limited to such a use, however, and I do not restrict or limit myself to this or other specific uses of the invention.

As shown, there are two pipes or tubes in connection with the indicating device. The pipe or tube 1 is in direct communication with a quantity of liquid of constant level in a chamber 2 and the pipe or tube 3 is in direct communication with a quantity or body of liquid in the tank B. The chamber 2 may be in communication with the conditions above the level of the fuel in the tank B through a vent 4, or otherwise.

Both of the pipes or tubes 1 and 3 are completely filled with liquid. Said pipes are of small diameter and in practice they are preferably hollow wire which is sufficiently flexible to permit proper installation of the pipes or tubes, the same being bent or curved whenever required without the necessity of using special fittings or pipe connections, which would be the case if large or inflexible pipes were used. As shown, the pipes may be formed spirally, each around the other, so that they will be subject to the same conditions throughout their length and affected alike by any changes such as barometric changes, changes of temperature, changes due to acceleration, or other changes encountered in the use of the instrument. The hollow wire pipes or tubes being of small diameter possess the distinct advantage of holding or retaining the liquid in them by cohesion or capillary attraction of the liquid with the walls of the pipes, so that the liquid will not become displaced or flow out of the pipes by its own weight or by gravity. The capillary attraction of the liquid for the walls of the pipes maintains a perfect seal so that it is impossible for air to pass or to displace the liquid in the pipes, unless the air be under pressure or suction other than that to which it is subjected under normal conditions of operation and use of the invention.

While I have shown and described a construction in which two pipes or tubes are arranged to illustrate the principle of the invention, it will be understood that the number of pipes may be varied to meet different requirements. Therefore, I do not restrict myself to the use of any specific number of pipes, nor to pipes of any definite dimensions, nor to the manner in which they are arranged to be affected alike by all changes encountered in the use of the invention. These and other variations are contemplated so as to adapt the invention to obtain the best results under different conditions of use. However, it will be seen that the invention efficiently and satisfactorily accomplishes all of its intended purposes and, without limiting myself in the above or other unessential particulars, what I claim and desire to secure by Letters Patent, is:—

1. The combination with the fluid fuel supply receptacle of an engine, a chamber in the receptacle arranged to contain a constant level a quantity of fluid similar to the fluid in the receptacle, and an indicating device for indicating the quantity of fluid in the receptacle, of two tubes leading from the indicating device and communicating with the fluid in the receptacle and the fluid in said chamber respectively, said tubes being arranged and being supported adjacent to each other throughout their length and in contact with each other for relatively a considerable portion of their length, whereby they and their contents will be affected alike by all the changes to which they are subjected when in use.

2. The combination with the fluid fuel supply receptacle of an engine, a chamber in the receptacle arranged to contain at constant level a quantity of fluid similar to the fluid in the receptacle, and an indicating device for indicating the quantity of fluid in the receptacle, of two tubes leading from the indicating device and communicating with the fluid in the receptacle and the fluid in said chamber respectively, said tubes being arranged and being supported adjacent to each other throughout their length and in contact with each other for relatively a considerable portion of their length, whereby they and their contents will be affected alike by all the external changes to which they are subjected when in use, said tubes being of such diameter that by the capillary attraction of the fluid a perfect seal is effected, making is impossible for air to pass or to displace the fluid in the tubes, irrespective of the vibration to which they are subjected when in use.

3. The combination with the fluid fuel supply receptacle of an engine, a chamber in the receptacle arranged to contain at constant level a quantity of fluid similar to the fluid in the receptacle, and an indicating device for indicating the quantity of fluid in the receptacle, of a pair of tubes leading from the indicating device and communicating with the fluid in the receptacle and the fluid in said chamber respectively, said tubes being arranged spirally around and in contact with each other whereby they and their contents will be affected alike by all the changes to which they are subjected or which they encounter when in use.

4. The combination with the fluid fuel supply receptacle of an engine, a chamber in the receptacle arranged to contain at constant level a quantity of fluid similar to the fluid in the receptacle, and an indicating device for indicating the quantity of fluid in the receptacle, of a pair of tubes leading from the indicating device and communicating with the fluid in the receptacle and the fluid in said chamber respectively, said tubes being arranged spirally around and in contact with each other, whereby they and their contents will be affected alike by all the changes to which they are subjected or which they encounter when in use, said tubes being of such diameter that they will retain and hold the fluid therein by capillary attraction, forming a perfect seal, making it impossible for air to pass or to displace the fluid in the tubes.

LEWIS A. MAPEL.